US005907679A

United States Patent [19]
Hoang et al.

[11] Patent Number: 5,907,679
[45] Date of Patent: May 25, 1999

[54] HARD DRIVE UPGRADE SYSTEM

[75] Inventors: Phu T. Hoang, Gurnee; John F. Kiernan, Lindenhurst, both of Ill.

[73] Assignee: VisionTek, Gurnee, Ill.

[21] Appl. No.: 08/699,793

[22] Filed: Aug. 19, 1996

[51] Int. Cl.$^6$ .............................. G06F 9/455; G06F 15/16
[52] U.S. Cl. ...................... 395/200.5; 395/712; 395/652; 395/181
[58] Field of Search ..................................... 707/204, 202, 707/10; 395/712, 652, 200.5, 653, 181, 651, 182.08, 182.18, 182.22

[56] References Cited

U.S. PATENT DOCUMENTS

| 5,267,351 | 11/1993 | Reber et al. . | |
| 5,276,867 | 1/1994 | Kenley et al. | 707/204 |
| 5,301,286 | 4/1994 | Rajani . | |
| 5,325,522 | 6/1994 | Vaughn . | |
| 5,333,266 | 7/1994 | Boaz et al. . | |
| 5,367,698 | 11/1994 | Webber et al. . | |
| 5,394,526 | 2/1995 | Crouse et al. . | |
| 5,404,508 | 4/1995 | Konrad et al. | 707/202 |
| 5,418,913 | 5/1995 | Fujimoto . | |
| 5,437,013 | 7/1995 | Rubin et al. . | |
| 5,448,718 | 9/1995 | Cohn et al. . | |
| 5,450,584 | 9/1995 | Sekiguchi et al. . | |
| 5,452,468 | 9/1995 | Peterson . | |
| 5,469,573 | 11/1995 | McGill, III et al. | 395/712 |
| 5,471,606 | 11/1995 | Huang et al. . | |
| 5,485,606 | 1/1996 | Midgdey et al. | 707/10 |
| 5,497,491 | 3/1996 | Mitchell et al. . | |
| 5,497,492 | 3/1996 | Zbikowski et al. | 395/652 |
| 5,666,293 | 9/1997 | Metz et al. | 395/200.5 |
| 5,694,600 | 12/1997 | Khenson et al. | 395/652 |

*Primary Examiner*—Parshotam S. Lall
*Assistant Examiner*—Bau Trong Le
*Attorney, Agent, or Firm*—Wallenstein & Wagner, Ltd.

[57] ABSTRACT

A data transfer system and method for copying an operating system from an original hard drive to a replacement hard drive such that the replacement hard drive can be substituted for the original hard drive in a self-initializing manner. The system includes a data transfer program that identifies the operating system on the original hard drive. The data transfer program prepares the operating system for copying to the replacement hard drive and then copies the operating system, including all files of the operating system, to the replacement hard drive. After the operating system is copied onto the replacement hard drive, the replacement hard drive can be substituted for the original drive, and the replacement hard drive will be operable in a self-initializing manner.

37 Claims, 7 Drawing Sheets

HARD DRIVE UPGRADE SYSTEM

DESCRIPTION

1. Technical Field

The present invention relates to the methods and systems for upgrading an original hard drive located in a notebook computer to a larger-capacity replacement hard drive. In particular, the present invention details the complete transfer of all data from the original hard drive to the replacement hard drive.

2. Background Prior Art

Data located within the hard drive of an operating computer can be categorized as follows: 1) operating system(s) files, 2) applications files, and 3) application-associated files. A modern notebook computer must have a large hard drive to store this data due to the increased complexity and density of modern operating systems, applications, and application-associated files, including large data files from sources such as the internet. Many of the existing notebook computers in the market place have relatively small capacity hard drives that are no longer suitable for new applications or additional application-associated files.

A complete data transfer typically includes copying the operating system(s), the applications, and all the application-associated files, and reconfiguring the files that are stored on the replacement hard drive in such a way that it will operate the same as the original hard drive. The most common techniques to upgrade the hard drive to a larger-capacity hard drive, while transferring all the data, are:

(a) Using a network connection to copy only the application-associated files to a second computer installing the new hard drive, reinstalling the operating system from the original set of system floppy disks, reinstalling the applications from the original set of system floppy disks, and copying the application-associated files back from the second computer; or (b) Backing up only the application-associated files to multiple floppy disks, installing the new hard drive, reinstalling the operating system from the original set of system floppy disks, reinstalling the applications from the application floppy disks, and copying the application-associated files back from the multiple floppy disks.

Both methods require the user to reinstall the operating system(s), reinstall the applications, and reconfigure the operating system files from the default settings, all of which can take a few hours. The user can not simply backup the complete hard drive and copy it back to a replacement hard drive, because the operating systems and the applications would be copied back improperly and the operating system would not self-initialize, or "boot." Therefore, simply backing up the complete hard drive and copying it back to a replacement hard drive would lead to an unusable new hard drive.

The present invention allows a simple solution for transferring the complete data and data structure on the original hard drive to a new or replacement hard drive without having to separately reinstall the operating system and the applications. Thus, the present invention is provided to solve the above identified and other problems.

SUMMARY OF THE INVENTION

The present invention is directed to a system and method for copying the operating system and all data stored on a relatively small storage capacity original hard drive to a relatively large storage capacity replacement hard drive, so that the system is bootable from the replacement hard drive.

The data program identifies the operating system stored on the original hard drive. Based on the identity of the operating system stored on the original hard drive, the data transfer program backs up the operating system files in such a way that the files can be copied by a computer running a DOS operating system. The data transfer program then copies all the files from the original hard drive to the replacement hard drive while the computer is running DOS. Then, the data transfer program restores the operating system files back to the file's original format, according to the particular identity of the operating system that was stored on the original hard drive. When the original hard drive is replaced by the new or replacement hard drive, the computer is able to self-initialize or "boot" from the replacement drive.

The replacement hard drive is connected to a PCMCIA port of a notebook computer to copy information to the replacement hard drive. The data transfer program is loaded from a floppy disk(s).

For a better understanding of the invention, reference may be had to the following specification taken in conjunction with the following drawing. Furthermore, other features and advantages of the invention will be apparent from the following specification taken in conjunction with the following drawings.

DETAILED DESCRIPTION

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated. Specifically, it should be understood that although the following description is directed a to laptop computer, also known as a notebook computer, the invention would extend to other types of computer architectures or configurations, for example, a desktop computer in which a second hard drive controller connection is unavailable.

Figure 1:
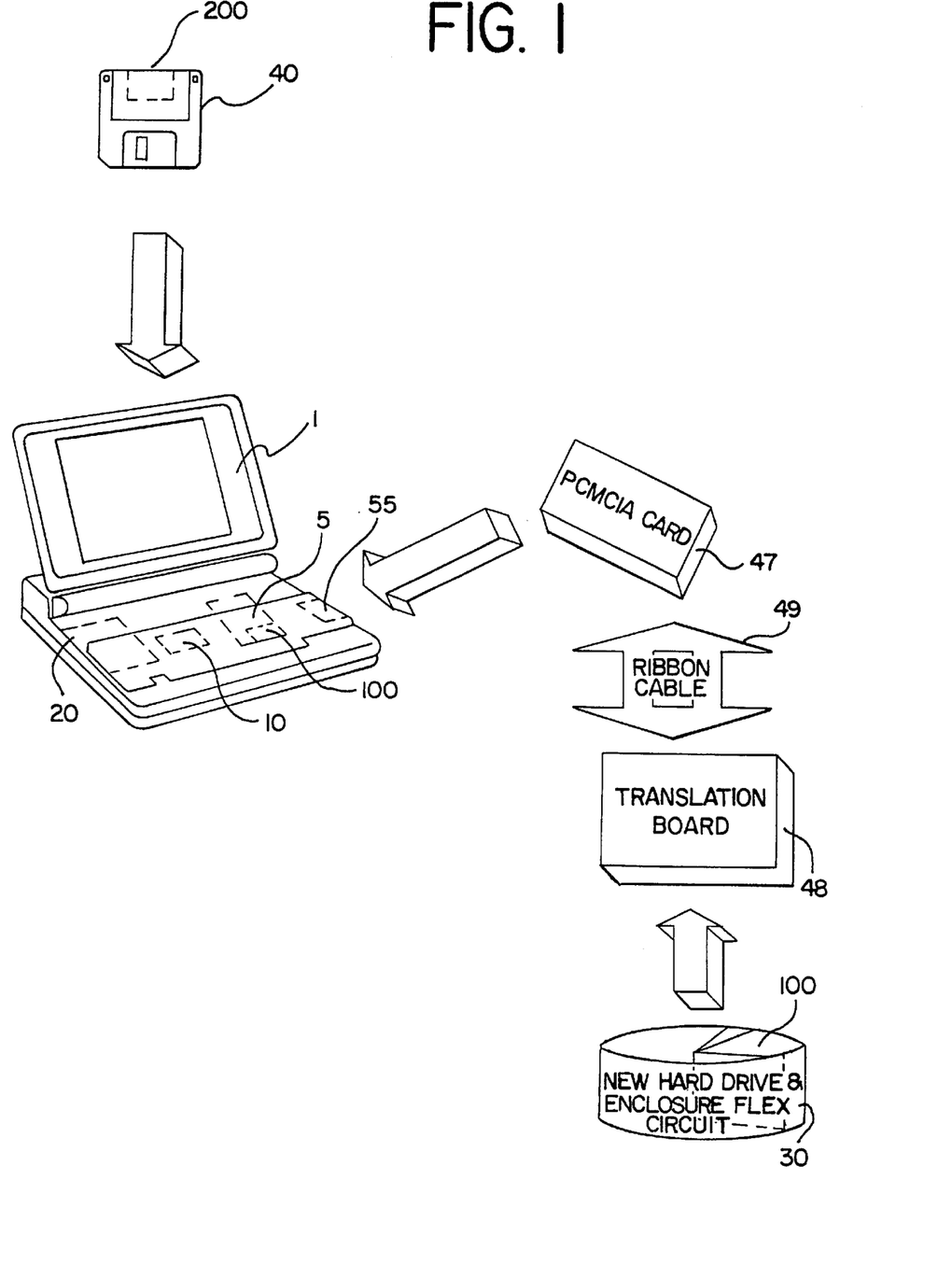
FIG. 1 is a block diagram of the hard drive upgrade system of the present invention.

As shown in FIG. 1, a data transfer system is provided for a computer 1 having a processor 10. The computer has a first storage device 5, such as an original hard drive 5, and a data reading device 20, such as a floppy drive 20. As shown in FIG. 1, the computer 1 has an operating system 100 stored on the original hard drive 5 in a self-initializing, or "bootable," manner. The computer 1 also has a male PCMCIA interface slot 55 communicatively coupled to the processor 10. However, the data transfer system could also be used with a computer using a communications port other than a PCMCIA port, for example, a hard drive controller, a serial port, or a parallel port.

As shown in FIG. 1, the data transfer system copies the operating system 100 from the original hard drive to a second storage device 30, such as a new or replacement hard drive 30. Such replacement hard drives are available in the computer hardware market and commonly sold by the assignee of the present invention, VisionTek, Inc., and other hard disk drive suppliers. The system is comprised of a data transfer program 200, as represented in FIG. 2 and a data exchange link 45, shown in FIGS. 1 and 7, for coupling the computer 1 to the replacement hard drive 30.

Figure 2:
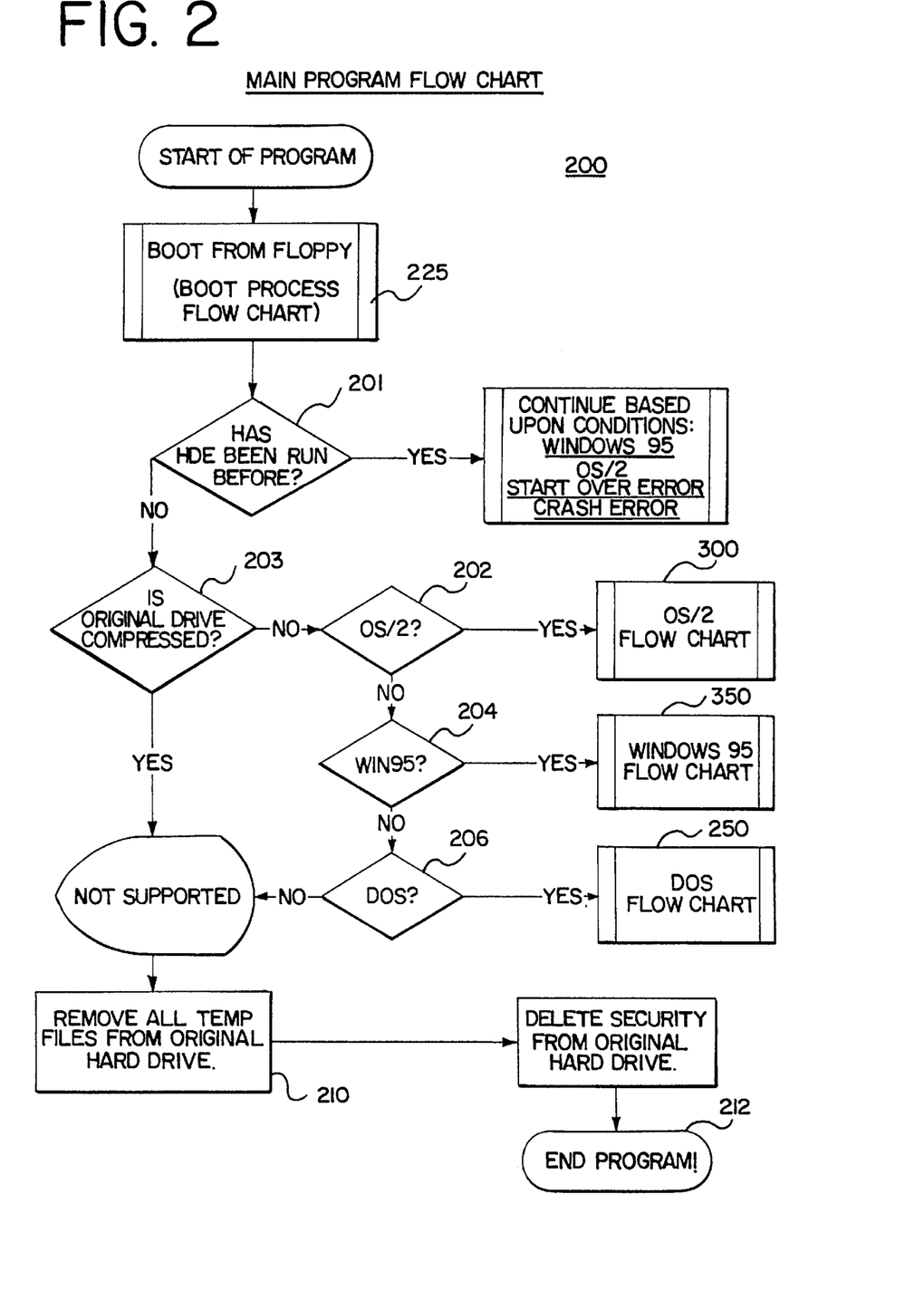
FIG. 2 is a flow chart of the overall data transfer program.
Figure 3:
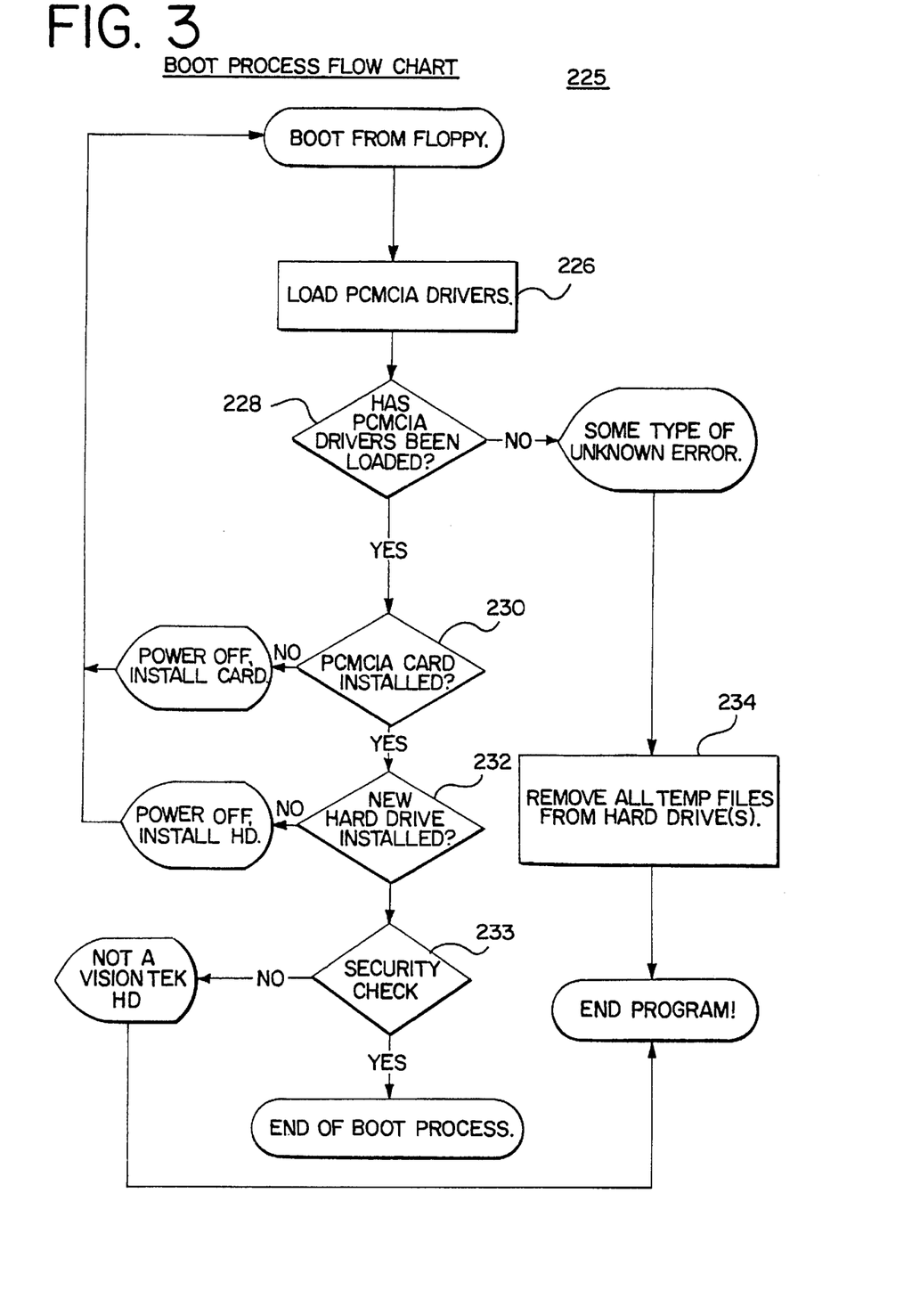
FIG. 3 is a flow chart of the boot up procedure contained in the data transfer program.

The data transfer program 200, shown in FIG. 2, stored on the transfer system floppy disk(s) 40, is loaded onto the computer 1 by booting up the computer with the transfer system floppy disk(s) 40 loaded in the floppy drive 20. The data transfer program 200 begins a boot up process 225 shown in FIG. 3, and loads a DOS operating system, typically DOS 5.0, into the computer 1. At Step 226, the boot up process 225 then loads a DOS PCMCIA driver, such as the Card Services program, licensed by Phoenix Technologies, Santa Clara, Calif. (408-654-9000). If an error is detected in the PCMCIA driver at Step 228, the boot process 225 removes all temporary files from the original hard drive 5, at Step 234, and the data transfer program 200 ends. If no error is detected, the boot up process 225, at Step 230, verifies whether the PCMCIA card 46 is connected, and at Step 232, whether the replacement hard drive 30 is attached thereto.

As shown in FIG. 2, the data transfer program 200 identifies the operating system 100, which is the particular operating system that is stored on the original hard drive 5, and that self-initializes or "boots up" the computer 1 upon powering up the computer 1 or restarting the computer 1. At Step 202, the data transfer program 200 searches for an OS2KRNL file. If the OS2KRNL file is found, the file is analyzed to determine whether the operating system 100 is "OS/2," and if so, the data transfer program 200 identifies the operating system 100 accordingly. If the data transfer program 200 finds the OS2KRNL file, a further analysis is performed to determine whether DOS is also loaded on the original hard drive 5. If DOS is also stored on the original hard drive 5, "OS/2" is said to be "dual bootable," allowing the computer to boot up either "OS/2" or DOS, and the data transfer program 200 identifies the operating system 100 as "OS/2" dual bootable. If the OS2KRNL file is not found, the data transfer program 200 looks for a MSDOS.SYS file, at Step 204. If the data transfer program 200 finds a MSDOS.SYS file, the file is analyzed, at Step 204, to determine if the operating system 100 is "WINDOWS 95" or MS-DOS, and the operating system 100 is identified accordingly. If the data transfer program 200 does not find an MSDOS.SYS file, it looks for an IBMDOS.COM file, and if the IBMDOS.COM file is found, the data transfer program 200 identifies the operating program 100 as DOS, at Step 206. If the data transfer program 200 does not find an OS2KRNL file, a MSDOS.SYS file, or an IBMDOS.COM file, the data transfer program 200 removes all temporary files, at Step 210, from the original hard drive 5 and ends, at Step 212. If the data transfer program 200 is successful in identifying the operating system 100, the transfer program 200 selects the appropriate corresponding procedure, as follows.

Figure 4:
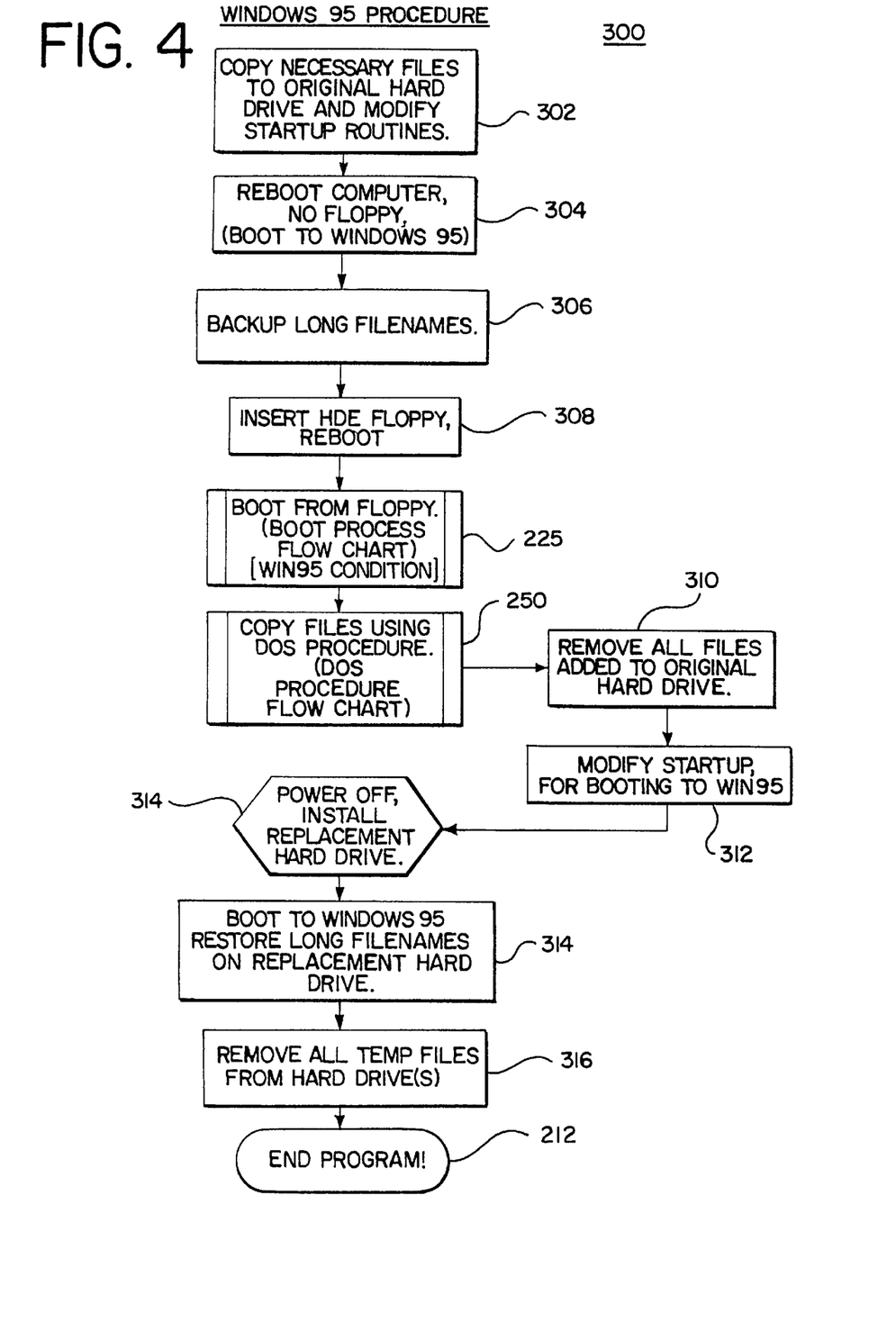
FIG. 4 is a flow chart of the "WINDOWS 95" procedure contained in the data transfer program.

When the operating system 100 is "WINDOWS 95," the data transfer program 200 goes to the "WINDOWS 95" procedure 300, as shown in FIG. 4. The "WINDOWS 95" procedure 300, at Step 302, creates a file on the original hard drive 5 that acts as a marker. Since the computer 1 may be re-initialized, or in other words, rebooted, several times during the operation of the data transfer system or method, the data transfer program 200 must keep track of which procedure it was performing before the computer 1 was last rebooted. The marker file tracks the position within the system sequence of the data transfer program 200. At Block 302, the data transfer program 200 also prepares the files stored on the original hard drive 5 to be copied while the computer 1 is in running DOS rather than "WINDOWS 95." This data preparation is necessary, because of a feature of "WINDOWS 95" that allows users to create long file names. Normally, the long file names cannot be copied while the computer 1 is running the DOS operating system, such as during the copy routine, at Step 258, of the DOS procedure 250, shown in FIG. 6. The data transfer program 200 overcomes this problem by backing up the long file names. The "WINDOWS 95" procedure 300, at Step 302, FIG. 4, modifies the "WINDOWS 95" start up files, as described above, to instruct the computer 1 to back up the long file names upon the computer 1 being rebooted. After the start up file is modified, but before the computer 1 is rebooted, the "WINDOWS 95" procedure 300 instructs the user to reboot the computer 1 without the transfer program system floppy disk(s) 40 loaded in the floppy drive 20; this causes the original hard drive 5, at Step 304, to boot up "WINDOWS 95" and initiate the "WINDOWS 95" modified start up file. As stated above, the "WINDOWS 95" modified start up file initiates a routine, at Step 306, that backs up every long file name on the original hard drive 5, allowing the files to be copied by the computer 1 running in a DOS operating system environment. After all the long file names are backed up, the system instructs the user to load, at Step 308, the transfer system floppy disk(s) 40 into the floppy drive 20 and reboot the computer 1 again.

Figure 5:
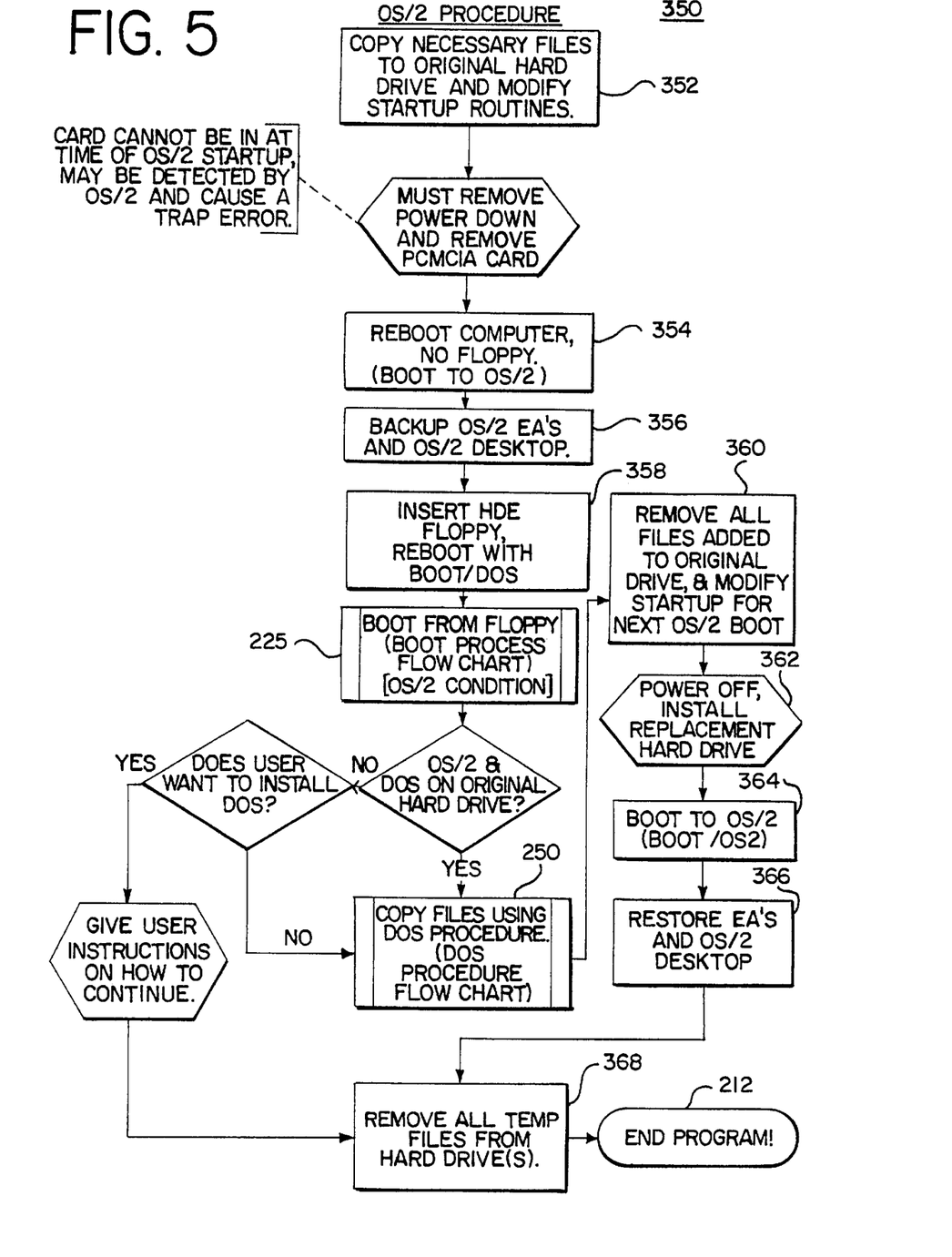
FIG. 5 is a flow chart of the "OS/2" procedure contained in the data transfer program.

Alternatively, when, instead of "WINDOWS 95", the operating system 100 is "OS/2", the data transfer program 200 goes to the "OS/2" procedure 350, as shown in FIG. 5. The "OS/2" procedure 350 creates files, at Step 352, on the original hard drive 5 that act as a program marker. Since, as noted above in the Windows 95 procedure 300, the computer 1 may be re-initialized, or in other words, re-booted, several times during the operation of the data transfer system or method, the data transfer program 200 must keep track of which procedure it was performing before the computer 1 was last rebooted. The marker file tracks the position within the system sequence of the data transfer program 200. Also at Block 352, the data transfer program 200 prepares the files stored on the original hard drive 5 to be copied while the computer 1 is in running DOS rather than "OS/2." This data preparation is necessary, because files within the "OS/2" operating system include "Extended Attributes" and the OS/2 operating system includes a "Desktop," which cannot be properly copied when the computer 1 is running the DOS operating system, as is well know in the art. Normally, the Extended Attributes and the Desktop cannot be copied while the computer 1 is running a DOS operating system, such as during the copy routine, at Step 258 of the DOS procedure 250, shown in FIG. 6. The data transfer program 200 overcomes this problem by backing up the Extended Attributes and Desktop so they can be copied while the computer is running a DOS operating system. The "OS/2" procedure 350, at Step 352, FIG. 5, modifies the "OS/2" start up files to instruct the computer 1 to back up the Extended Attributes and Desktop upon reboot of the computer 1. After the start up file is modified, but before the computer 1 is rebooted, the "OS/2" procedure 350, at Step 354, instructs the user to reboot the computer 1 without the transfer program system floppy disk(s) 40 loaded in the floppy drive 20. This causes the original hard drive 5 to boot up "OS/2" and initiate the "OS/2" modified start up file. It should be noted that for "OS/2" to be loaded without any errors, the PCMCIA card 50 on the data exchange link 45 must be disengaged from the PCMCIA slot 55 in the computer 1 before boot up. As explained above, the "OS/2" modified start up file, at Step 356, initiates a routine that backs up the Extended Attributes and Desktop on the original hard drive 5, backing up the files in a format that allows the files to be copied when the computer 1 is running a DOS operating system. Once the "OS/2" Extended Attribute and "OS/2" Desktop files are backed up, the "OS/2" procedure 350 instructs the user, at Step 358, to engage the PCMCIA card 50 on the data exchange link 45 into the PCMCIA slot 55 on the computer 1. At Step 358, the "OS/2" procedure 350 also instructs the user to load the data transfer disk(s) 40 into the floppy drive 20 and reboot the computer 1 again.

Figure 6:
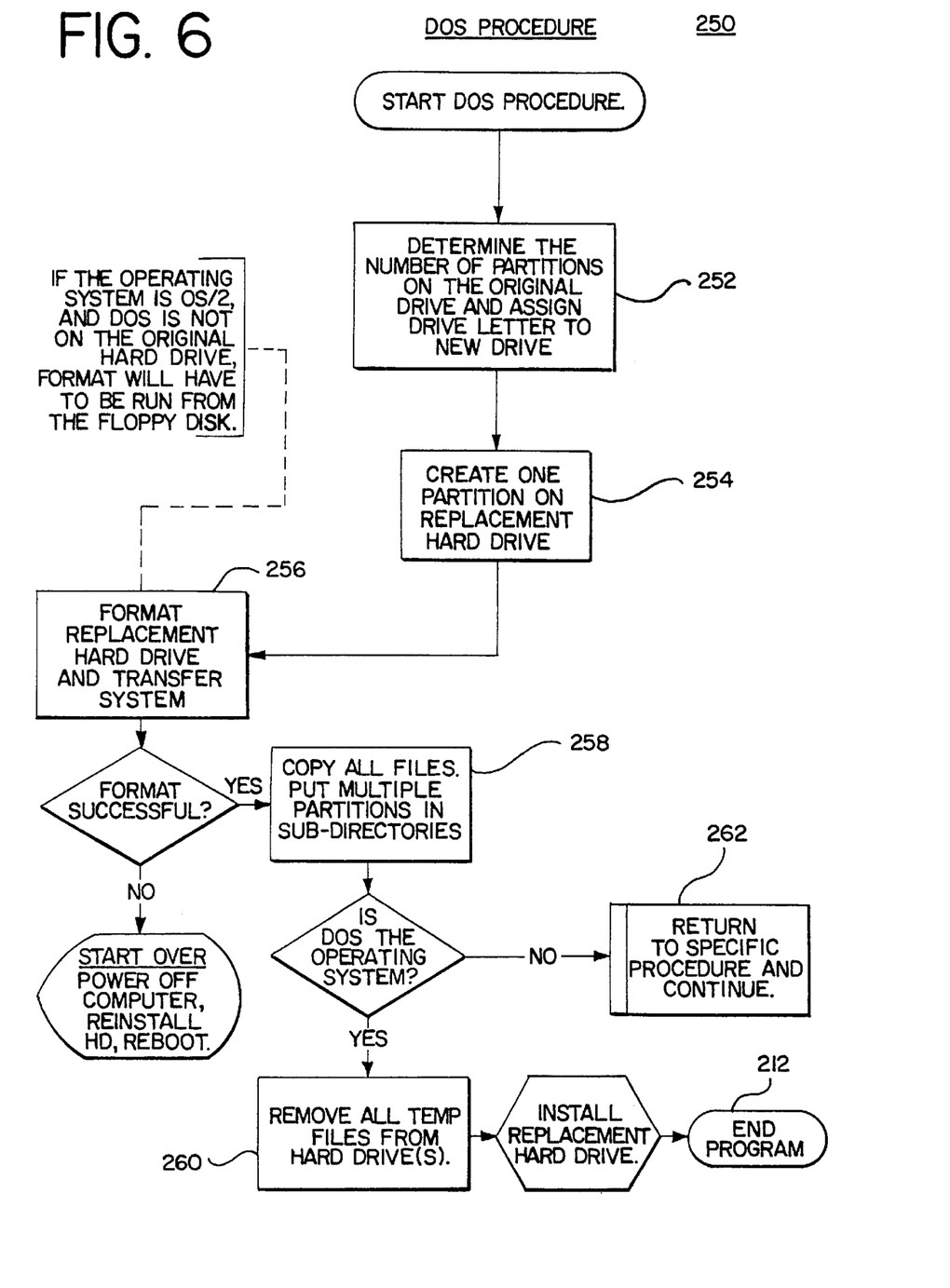
FIG. 6 is a flow chart of the DOS procedure contained in the data transfer program.

When the operating system 100 is either "WINDOWS 95" or "OS/2," and the user boots up the computer, the data transfer system disk(s) 40 loads the DOS operating system and then loads the data transfer program 200 into the computer. At Step 250, in FIG. 4 and FIG. 5, for "WINDOWS 95" and "OS/2," respectively, the data transfer program 200 initiates the DOS procedure 250. Alternatively, when, instead of "WINDOWS 95" or "OS/2", the operating system 100 is DOS, the data transfer program 200 runs the DOS procedure shown in flow chart 250, as shown in FIG. 6.

At Step 252, the DOS procedure 250 determines the number of partitions that are on the original hard drive 5, and creates a single partition, at Step 254, on the replacement hard drive 30. If multiple partitions existed on the original hard drive 5, the DOS procedure 250 creates individual directories representing each respective partition that existed on the original hard drive 5. As is well known in the art, the present invention could be designed to create two partitions rather than one partition on the replacement drive 30. Nevertheless, the present embodiment creates one partition. When the operating system 100 is DOS or "WINDOWS 95," the DOS procedure 250, at Step 256, formats the replacement hard drive 30 by executing the disk "format" command of the operating system 100 that is stored on the original hard drive 5. Similarly, if the operating system 100 is "OS/2," and DOS is loaded on the original hard drive 5, the DOS procedure 250, at Step 256, formats the replacement hard drive 30 by executing the DOS disk "format" command that is stored on the original hard drive 5. Alternatively, if the operating system 100 is "OS/2" and DOS is not loaded on the original hard drive 5, the DOS procedure 250, at Step 256, formats the replacement hard drive 30 by executing the disk "format" command that is stored on the data transfer system disk(s) 40.

At Step 258, the DOS procedure 250 copies all files that are stored on the original hard drive 5, including operating system files, applications files, and application-associated files, to the replacement drive 30. When copying all the files on the original hard drive 5, the DOS procedure 250 copies all hidden files and system files, as is well known in the art, which are not copied when executing the "WINDOWS 95", DOS or "OS/2" file "copy" commands. Once all the files, including the hidden and system files, are copied to the replacement hard drive 30, the replacement hard drive 30 is self-initializing, or "bootable." Consequently, the operating system 100, now existing on the replacement hard drive 30, and copied from the original hard drive 5, is capable of self-initializing, or booting up, the computer 1 after the replacement hard drive 30 is installed therein.

When the operating system 100 is DOS, the DOS procedure 250 removes all temporary files, at Step 260, such as the marker file, from both the original hard drive 5 and the replacement hard drive 30. The DOS procedure 250 then instructs the user to power off the computer 1 and remove the original hard drive 5 from the computer 1 and replace the original hard drive 5 with the new or replacement hard drive 30. The replacement hard drive 30 is now operable and self-initializing in the computer 1, having the same operating system and all the files contained on the original hard drive 5.

Alternatively, when the operating system 100 is "WINDOWS 95," the DOS procedure 250 returns, at Step 262, to the "WINDOWS 95" procedure 300, shown in FIG. 4. The "WINDOWS 95" procedure 300, at Step 310, removes the temporary files that the data transfer program 200 copied onto the original hard drive 5, such as the marker file. The "WINDOWS 95" procedure 300 then modifies, at Step 312, the "WINDOWS 95" start up program on the replacement hard drive 30. At Step 314, the "WINDOWS 95" procedure 300 instructs the user to power off the computer 1 and remove the original hard drive 5 from the computer 1 and replace the original hard drive 5 with the replacement hard drive 30. When the computer 1 is rebooted using the replacement drive 30, the "WINDOWS 95" modified start up program restores, at Step 314, all the long back up file names and removes, at Step 316, all temporary files, such as the marker file, from the replacement hard drive 30. The replacement hard drive 30 is now self-initialing and operable in the computer 1, having the same operating system and all the files contained on the original hard drive 5.

Alternatively, when the operating system 100 is "OS/2", the DOS procedure 250 returns to the "OS/2" procedure 350, as shown in FIG. 5. The "OS/2" procedure 350 removes, at Step 360, all files added to the original hard drive 5, and modifies, at Step 360, the "OS/2" start up program on the replacement hard drive 30.

The "OS/2" procedure 350 then instructs the user to power off, at Step 362, the computer 1 and remove the original hard drive 5 from the computer 1 and replace the original hard drive 5 with the replacement hard drive 30. When the computer 1 is rebooted, at Step 364, with the replacement drive 30, the "OS/2" modified start up program restores, at Step 366, the "OS/2" Extended Attribute files and the "OS/2" Desktop files, and then removes, at Step 368, the temporary files, such as the marker file, from the replacement hard drive 30. The replacement hard drive 30 is now self-initializing and operable in the computer 1, having the same operating system and all the files contained on the original hard drive 5.

Figures 7, 8:
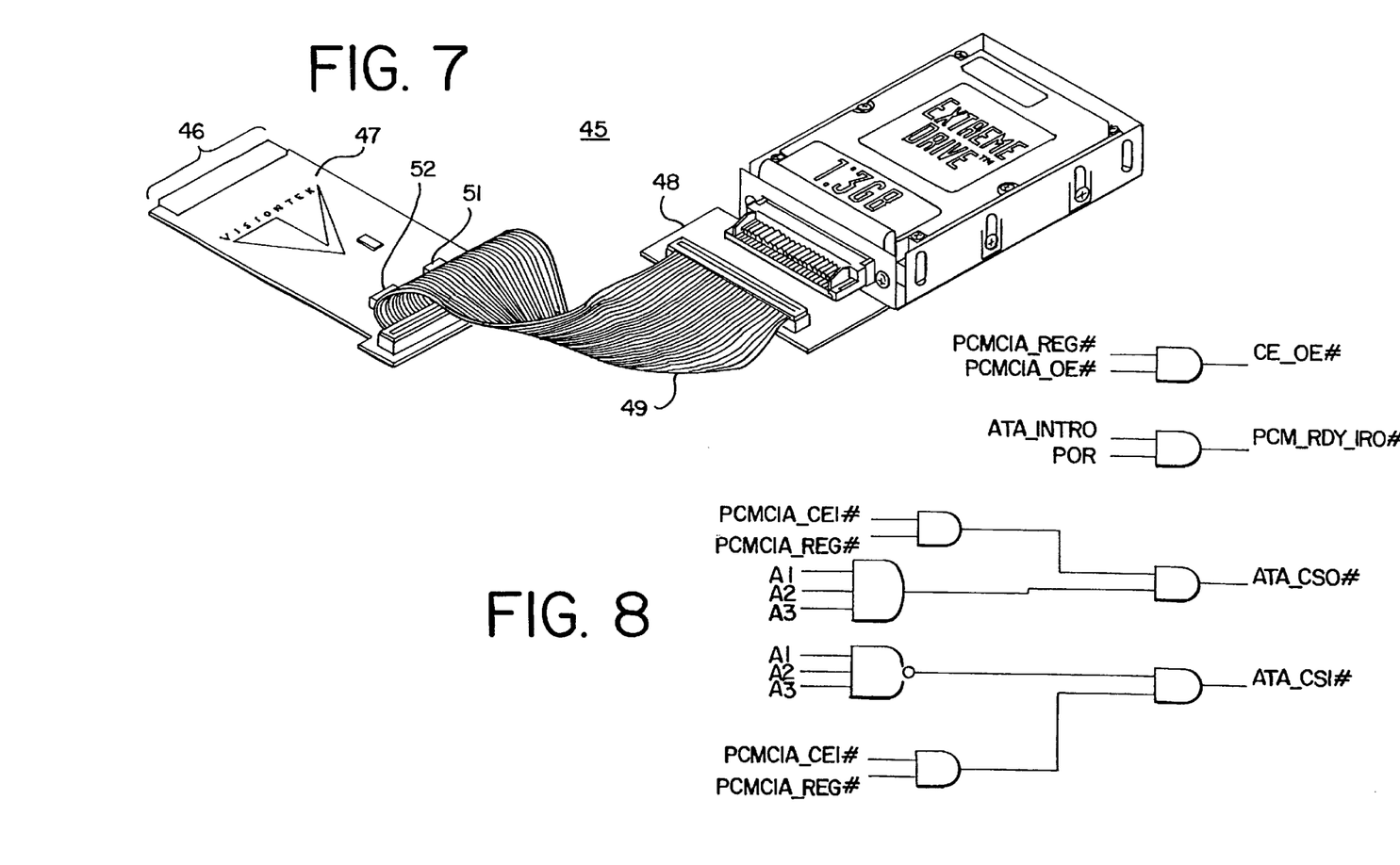
FIG. 7 is a perspective view of the data exchange link.
FIG. 8 is a boolean logic diagram of the PCMCIA to ATA translation.

As shown in FIG. 7, the data exchange link 45 is the device that connects the replacement drive 30 to the PCMCIA port 55 of the computer 1. The data exchange link 45 has a female PCMCIA connector 46 attached to a printed circuit board ("PCB") 47, also known as a PCMCIA card, such as those sold by PCMCIA, Sunnyvale, Calif. (408-720-0107). As is well known by those skilled in the art, the PCB 47 is logically designed and programmed, as shown in FIG. 8, to translate a PCMCIA signal to a IDE/ATA signal for communicating with the replacement hard drive 30. The logical translation takes place on an EEPROM 51, such as those sold by Atmel, San Jose, Calif. (408-441-0311), part number AT26C16, and on a programmable logic device ("PLD") 52, such as sold by Advanced Micro Devices (AMD), Sunnyvale, Calif. (408-732-2400), part number PALCE22VI0. The EEPROM 51 can be programmed according to the PCMCIA specification, as is well known by those skilled in the art. The data exchange link 45 has a translation PCB 48 for interfacing to the replacement hard drive 30. A ribbon cable 49, such as those sold by Samtec, New Albany, Ind. (800-726-8329), part number TCSD-25-D-05-01-N, connects the PCB 47 to the translation PCB 48.

In conclusion, it will be understood that the invention may be embodied in other specific forms without departing from the spirit or central characteristics thereof. The present example and embodiment, therefore, is to be considered in all respects as illustrative and not restrictive, and the invention is not to be limited to the details given herein. For instance, in the preferred embodiment, the present invention is implemented in the "C/C++" programming language. However, the present invention is capable of being implemented in other languages and formats by those skilled in the art. Therefore, the scope of protection is only limited by the scope of the accompanying claims.

We claim:

1. A data transfer system for a personal computer having a processor, an original hard drive, a data reading device, an operating system from a plurality of personal computer operating system types stored on the original hard drive in a self-initializing manner, the data transfer system for copying the operating system from the original hard drive to a replacement hard drive such that the replacement hard drive can be substituted for the original hard drive, the system comprising:

a data transfer program stored on a compact removable transfer media and readable by the data reading device having:

computer readable code for causing the computer to identify the type of personal computer operating system stored on the original hard drive;

computer readable code for causing the computer to prepare the operating system stored on the original hard drive for copying to the replacement hard drive; and, computer readable code for causing the computer to copy the operating system to the replacement hard drive in a self-initializing manner.

2. The data transfer system of claim 1, wherein the copying means copies the operating system to the replacement hard drive via a data exchange link.

3. The data transfer system of claim 1, wherein the processor is coupled to a port having a male PCMCIA interface.

4. The data transfer system of claim 2, wherein the data exchange link has a female PCMCIA interface.

5. The data transfer system of claim 4, wherein the female PCMCIA interface is attached to a PCB.

6. The data transfer system of claim 5, wherein the PCB is logically programmed to translate a PCMCIA signal to a signal for communicating with the replacement hard drive.

7. The data transfer system of claim 2, wherein the data exchange link has a translation PCB for interfacing to the replacement hard drive.

8. The data transfer system of claim 7, wherein the data exchange link has a ribbon cable for connecting the PCB to the translation PCB.

9. The data transfer system of claim 1, wherein the data reading device is a floppy disk drive.

10. A data transfer system for a personal computer having a processor, an original hard drive, a data reading device, an operating system from a plurality of personal operating system types stored on the original hard drive in a self-initializing manner, the data transfer system for copying the operating system from the original hard drive to a replacement hard drive such that the replacement hard drive ca be substituted for the original hard drive, the system comprising:

a data transfer program stored on a compact removable transfer media and readable by the data reading device including:

means for causing the computer to identify the type of personal computer operating system stored on the original hard drive;

means in response to the type of operating system identified for causing the computer to back up the operating system from an original format into a backed up format;

means for causing the computer to initialize and operate the processor with a DOS operating system;

means for causing the computer to use the DOS operating system for copying the operating system onto the replacement hard drive in a self-initializing manner;

means for restoring the operating system from the back up format to the original format on the replacement hard drive;

whereby the operating system is stored on the replacement hard drive in a self-initializing manner.

11. The data transfer system of claim 10, wherein the backing up means, responsive to identification of an "OS/2" operating system having Extended Attribute files and Desktop files, back up the Extended Attribute files and "OS/2" Desktop files on the original hard drive.

12. The data transfer system of claim 10, wherein the backing up means, responsive to identification of a "WINDOWS 95" operating system having long files names, back up the long file names.

13. A data transfer system for a personal computer having a processor, a first storage device, a data reading device, an operating system from a plurality of personal computer operating system types stored on the first storage device in a self-initializing manner, the data transfer system for copying the operating system from the first storage device to a second storage device such that the second storage device can be substituted for the first storage device, the system comprising:

a data exchange link for coupling the processor to the second storage device;

a data transfer program stored on a compact removable transfer media and readable by the data reading device including:

means for causing the computer to identify the type of personal computer operating system stored on the first storage device;

means for causing the computer to prepare the operating system stored on the first storage device for copying to the second storage device;

means for copying the operating system to the data storage device in a self-initializing manner without erasing the operating system stored on the first storage device.

14. The data transfer system of claim 13, wherein the processor is coupled to a port having a male PCMCIA interface.

15. The data transfer system of claim 13, wherein the data exchange link has a female PCMCIA interface.

16. The data transfer system of claim 15, wherein the female PCMCIA interface is attached to a PCB.

17. The data transfer system of claim 16, wherein the PCB is logically programmed to translate a PCMCIA signal to a signal for communicating with the second storage device.

18. The data transfer system of claim 13, wherein the data exchange link has an PCB for interfacing to the second storage device.

19. The data transfer system of claim 18, wherein the data exchange link has a ribbon cable for connecting the PCB to the translation PCB.

20. The data transfer system of claim 13, wherein the first storage device is a hard disk drive.

21. The data transfer system of claim 13, wherein the second storage device is a hard disk drive.

22. The data transfer system of claim 13, wherein the data reading device is a floppy disk drive.

23. A data transfer system for a personal computer having a processor, a first storage device, a data reading device, an operating system from a plurality of personal computer operating system types stored on the first storage device in a self-initializing manner, the data transfer system for copying the operating system from the first storage device to a second storage device such that the second storage device can be substituted for the first storage device, the system comprising:

a data exchange link for coupling the processor to the second storage device;

a data transfer program stored on a compact removable transfer media and readable by the data reading device further including:

means for causing the computer to identify the type of personal computer operating system stored on the first storage device;

means in response to the type of operating system identified for causing the computer to back up the operating system from an original format into a backed up format;

means for initializing and operating the processor with a DOS operating system;

means for causing the computer to use the DOS operating system for copying the operating system onto the second storage device in a self-initializing manner;

means for restoring the operating system from the backed up format to the original format on the second storage device;

whereby the operating system is stored on the second storage device in a self-initializing manner.

24. The data transfer system of claim 23, wherein the backing up means, responsive to identification of an "OS/2" operating system having Extended Attribute files and Desktop files, back up the Extended Attribute files and "OS/2" Desktop files on the original hard drive.

25. The data transfer system of claim 23, wherein the backing up means, responsive to identification of a "WINDOWS 95" operating system having long files names, back up the long file names.

26. The data transfer system of claim 23, wherein the processor is coupled to a port having a female PCMCIA interface.

27. The data transfer system of claim 23, wherein the data exchange link has a male PCMCIA interface.

28. The data transfer system of claim 27, wherein the male PCMCIA interface is attached to a PCB.

29. The data transfer system of claim 28, wherein the PCB is logically programmed to translate a PCMCIA signal to a signal for communicating with the second storage device.

30. The data transfer system of claim 23, wherein the data exchange link has an translation PCB for interfacing to the second storage device.

31. The data transfer system of claim 30, wherein the data exchange link has a ribbon cable for connecting the PCB to the translation PCB.

32. The data transfer system of claim 23, wherein the first storage device is a hard disk drive.

33. The data transfer system of claim 23, wherein the second storage device is a hard disk drive.

34. The data transfer system of claim 23, wherein the data reading device is a floppy disk drive.

35. A method for transferring data for a computer having a processor, a first storage device, a data reading device, an operating system from a plurality of personal computer operating system types stored on the first storage device in a self-initializing manner, the method for transferring the operating system from the first storage device to a second storage device such that a user can directly substitute the second storage device for the first storage device, the method comprising the steps of:

inserting a compact removable media into the data reading device:

reading a program stored on the media;

identifying the type of personal computer operating system stored on the first storage device in response to the program read from the media;

initializing and operating the processor in response to the program read from the media with a DOS operating system;

copying in response to the program read from the media all hidden, system, and other operating system files from the first storage device to the second storage device in a self-initializing manner using the DOS operating system.

36. The method of claim 35 further comprising the steps of:

after the identifying step, and responsive to identification of an OS/2 operating system having Extended Attribute files and Desktop files, backing up the Extended Attribute files and OS/2 Desktop files on the original hard drive from an original format into a backed up format; and, restoring the operating system from the backed up format to the original format on the second storage device, after the copying step.

37. The method of claim 35 further comprising the steps of:

after the identifying step, and responsive to identification of a Windows 95 operating system having long files names, backing up the long file names on the original hard drive from an original format into a backed up format; and, restoring the operating system from the backed up format to the original format on the second storage device, after the copying step.

* * * * *